July 5, 1938.   M. A. LARE   2,122,720

TRACTOR WHEEL RIM

Filed July 24, 1936

Inventor

*Maurice A. Lare,*

By *Clarence A. O'Brien*
*Hyman Berman*

Attorneys

Patented July 5, 1938

2,122,720

UNITED STATES PATENT OFFICE 2,122,720

TRACTOR WHEEL RIM

Maurice A. Lare, Brock, Nebr.

Application July 24, 1936, Serial No. 92,441

2 Claims. (Cl. 301—44)

This invention relates to a tractor wheel rim, the general object of the invention being to provide a rim which will not pack the soil and does not fill with soil and gives added traction in all kinds and classes of soil. It will also increase the speed of the machine at the same r. p. m.

This invention also combines certain other features of construction and in the combination and arrangement of the several parts the combination of which produce an interlocking continuous rim consisting of several sections.

The rim composed of several sections, contains a knife-like cutting edge which cuts through and separates all trash and dirt over which the tractor wheel is run. The sections of the rim are so designed and are so attached to the original rim of the tractor wheel that the front or nose end of one section is held in place and locked by the rear end or heel of the section immediately in front. By similar processes each of the sections of the rim is held in place so that a continuous circular rim is composed of the several sections making the entire rim. The rear end of each rim section is held in place on the original tractor rim by bolts which pass through the original rim and the bar, or brace, which is a part of each section, and which is located near the rear end thereof. The brace or bar at the rear of each section is so constructed that it supports and braces the wings of the lug or section.

This invention prevents side slipping on sloping land and lister ridges and enables the tractor to be used in wet and swampy soil. This invention causes the tractor to roll more easily since there is a continuous weight carrying center rim, and since there is that continuous weight sustaining center rim, the continual climbing-like process of the tractor using ordinary, angle iron, or spade lugs is eliminated. This invention eliminates the side stress and strain on the tractor wheels as each side of the rim is identical, eliminating greater pressure on one side than on the other side of the wheel. The knife-like cutting edge of the rim cuts through all trash over which the wheels run and enables the lugs to secure traction with the earth which in turn eliminates slipping.

Important advantages and objects of the invention will be apparent from a reading of the following description taken in connection with the drawing, wherein for purposes of illustration I have shown a preferred embodiment of my invention.

In the drawing:—

Figure 1:
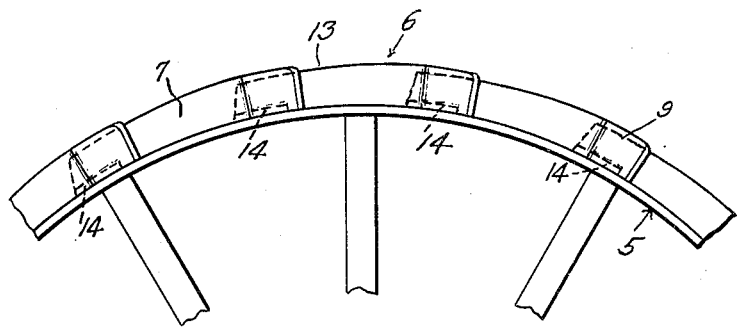
Figure 1 is a general side elevational view of a portion of the wheel rim in accordance with the present invention.
Figure 5:
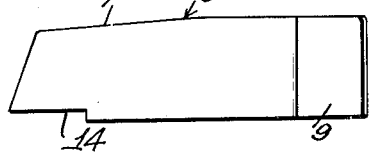
Figure 5 is an elevation of one of the traction elements.

Referring in detail to the drawing, the numeral 5 generally designates the rim of the tractor wheel, the numeral 6 each of the sections or traction elements.

Figure 4:
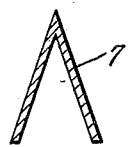
Figure 4 is a sectional view taken through the elongated portion thereof.

Each section element 6 comprises the elongated tapered portion 7 which has the inverted V-shaped cross-section clearly illustrated in Figure 4 and which is provided at its large end with the lateral wings 8 and 9 which are of general rectangular shape and which have a radially outward tilt besides the inclination in opposite axial directions with respect to the wheel.

Figure 3:
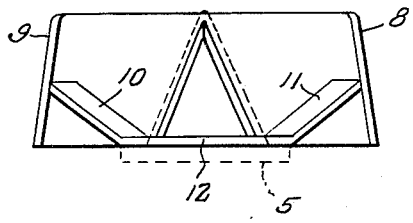
Figure 3 is an end elevational view thereof looking from right to left of Figure 2.
Figure 2:
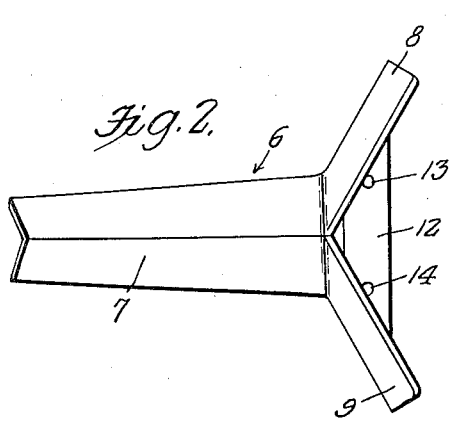
Figure 2 is a top plan view of one of the rim sections.

Extending from the right hand face of each wing 8 and 9 is the brace 10 and 11, respectively, which slant downwardly toward the rim 5, the braces being formed on the opposite ends of a bight portion 12 and which is provided with bolt holes 13 and 14 for fastening to the tractor wheel rim 5 as illustrated in Figure 3 of the drawing.

As is apparent in Figure 1 of the drawing, the elongated portion 7 is slightly curved in a radially inward direction as indicated by the numeral 13 and the small end thereof is held in place by the rear end or heel of the next section element as already mentioned herein.

The front end of each element 6 has a notch 14 therein which receives a portion of the part 12 of the element preceding it.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A tractor wheel rim comprising an annulus, traction elements circumferentially arranged on said rim, said traction elements being attached to said rim so that the nose end of each traction element is overlapped by and retained against the rim by the rear end of the traction element immediately in front thereof, and means connecting the rear end of each traction element to said rim.

2. A tractor wheel having a rim, a plurality of traction elements respectively comprising an elongated tapered angle lug of inverted V-shape having outwardly diverging wings at its large end and a cross bar connected with and extending transversely between said wings for supporting the latter, said traction elements being attached to said rim through their respective cross bars and being relatively arranged so that the front or smaller end of each lug overlaps the cross bar of the lug immediately in front thereof.

MAURICE A. LARE.